US008224954B2

(12) United States Patent
Qiu et al.

(10) Patent No.: US 8,224,954 B2
(45) Date of Patent: Jul. 17, 2012

(54) PROTECTING SUBSCRIBER DATABASE DATA INTEGRITY IN GEOGRAPHICAL REDUNDANT DEPLOYMENTS

(75) Inventors: Chaoxin Qiu, Austin, TX (US); Arshad Khan, Austin, TX (US); Niral Sheth, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 330 days.

(21) Appl. No.: 12/254,423

(22) Filed: Oct. 20, 2008

(65) Prior Publication Data

US 2010/0100614 A1 Apr. 22, 2010

(51) Int. Cl.
*G06F 15/173* (2006.01)
(52) U.S. Cl. ...................................... 709/224
(58) Field of Classification Search .................. 709/224
See application file for complete search history.

(56) References Cited

U.S. PATENT DOCUMENTS

| 2002/0037723 A1* | 3/2002 | Roach ........................... 455/435 |
| 2002/0136206 A1* | 9/2002 | Gallant et al. ................ 370/352 |
| 2007/0168704 A1* | 7/2007 | Connolly et al. ................ 714/6 |
| 2007/0248044 A1* | 10/2007 | Vogety et al. ................ 370/329 |
| 2009/0028135 A1* | 1/2009 | Mantripragada et al. ..... 370/352 |

* cited by examiner

Primary Examiner — William Goodchild
(74) Attorney, Agent, or Firm — Hope Baldauff Hartman, LLC

(57) ABSTRACT

Methods, systems, and computer-readable media for ensuring data integrity during data synchronization are provided. According to one method, a number of originating requests from a plurality of user endpoints are monitored across a network. A determination is made whether the number of originating requests is below a first threshold. Responsive to determining that the number of originating requests is below the first threshold, probe messages are transmitted to at least a portion of the plurality of user endpoints across the network. A number of the user endpoints that return probe replies in response to the probe messages are monitored. A determination is made whether the number of the user endpoints is below a second threshold. Responsive to determining that the number of the user endpoints is below the second threshold, a report is made to a database that the network is unavailable, thereby causing the database to stop updating time stamps.

12 Claims, 4 Drawing Sheets

PROTECTING SUBSCRIBER DATABASE DATA INTEGRITY IN GEOGRAPHICAL REDUNDANT DEPLOYMENTS

BACKGROUND

The Next Generation Network ("NGN") architecture is an increasingly developing packet-based communications network architecture that is capable of providing various types of telecommunications services, including voice, video, and other data. The IP Multimedia Subsystem ("IMS") is a NGN architecture originally defined by the 3rd Generation Partnership Project ("3GPP"). IMS can enable service providers to deploy new telecommunications services, simplify the network architecture by enabling Internet Protocol ("IP") and Session Initiation Protocol ("SIP") as a basis for communication, and facilitate fixed-mobile convergence.

NGNs are typically deployed with geographical redundancy in order to withstand the effects of site failures. Site failures may be caused by a power failure, a natural disaster, a cut cable, a damaged router, and various other network-related issues. In a typical geographical redundant deployment, subscriber information and other data stored in a critical subscriber database, such as a Home Subscriber Server (HSS), at a given site may be mirrored in a subscriber database at a remote site. In this way, data that cannot be retrieved due to the failure of one site can be recovered through the mirrored remote site.

The effectiveness of geographical redundancy may depend on the ability for the mirrored subscriber database to maintain the most current and correct data from the original subscriber database. Data coherence between the original subscriber database and the mirrored subscriber database may be ensured through a data synchronization process in which data that is updated in the original subscriber database is also updated in the mirrored subscriber database. This can be achieved by comparing time stamps associated with the data written to the original subscriber database with the time stamps associated with the data written to the mirrored subscriber database in order to determine whether the data in the mirrored subscriber database is current. If the mirrored subscriber database contains outdated data according to its time stamp, then the outdated data is overwritten with the current data from the original subscriber database.

While geographical redundancy as outlined above is suitable to recover from many catastrophic disasters, geographic redundancy has been shown to suffer drawbacks when a site-level failure is caused by certain types of network problems. In particular, after a first site operating a first subscriber database is isolated from other sites due to a network problem, subscribers may re-register with a second site in order to access a second subscriber database. Problems can occur, however, because network elements at the first site may continue to operate and update the time stamps at the first subscriber database with incorrect data. Thus, after the network problem is fixed at the first site, the data synchronization process may cause the second subscriber database to be updated with the incorrect data from the first subscriber database if the incorrect data has a newer time stamp.

SUMMARY

Embodiments of the disclosure presented herein include methods, systems, and computer-readable media for ensuring data integrity during data synchronization between databases. According to one aspect, a method for ensuring data integrity during data synchronization is provided. According to the method, a number of originating requests from a plurality of user endpoints are monitored across a network. A determination is made whether the number of originating requests is below a first threshold. Responsive to determining that the number of originating requests is below the first threshold, probe messages are transmitted to at least a portion of the plurality of user endpoints across the network. A number of the user endpoints that return probe replies in response to the probe messages are monitored. A determination is made whether the number of the user endpoints is below a second threshold. Responsive to determining that the number of the user endpoints is below the second threshold, a report is made to a database that the network is unavailable, thereby causing the database to stop updating time stamps.

According to another aspect, a system for ensuring data integrity during data synchronization is provided. The system includes a memory and a processor functionally coupled to the memory. The memory stores a program containing code for generating the media file. The processor is responsive to computer-executable instructions contained in the program and operative to monitor a number of originating requests from a plurality of user endpoints across a network, determine whether the number of originating requests is below a first threshold, responsive to determining that the number of originating requests is below the first threshold, transmit probe messages to at least a portion of the plurality of user endpoints across the network, monitor a number of the user endpoints that return probe replies in response to the probe messages, determine whether the number of the user endpoints is below a second threshold, and responsive to determining that the number of the user endpoints is below the second threshold, report to a database that the network is unavailable, thereby causing the database to stop updating time stamps.

According to yet another aspect, a computer-readable medium having instructions stored thereon for execution by a processor to perform a method for ensuring data integrity during data synchronization is provided. According to the method, a number of originating requests from a plurality of user endpoints are monitored across a network. A determination is made whether the number of originating requests is below a first threshold. Responsive to determining that the number of originating requests is below the first threshold, probe messages are transmitted to at least a portion of the plurality of user endpoints across the network. A number of the user endpoints that return probe replies in response to the probe messages are monitored. A determination is made whether the number of the user endpoints is below a second threshold. Responsive to determining that the number of the user endpoints is below the second threshold, a report is made to a database that the network is unavailable, thereby causing the database to stop updating time stamps.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to ensuring correct subscriber information at a subscriber database. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
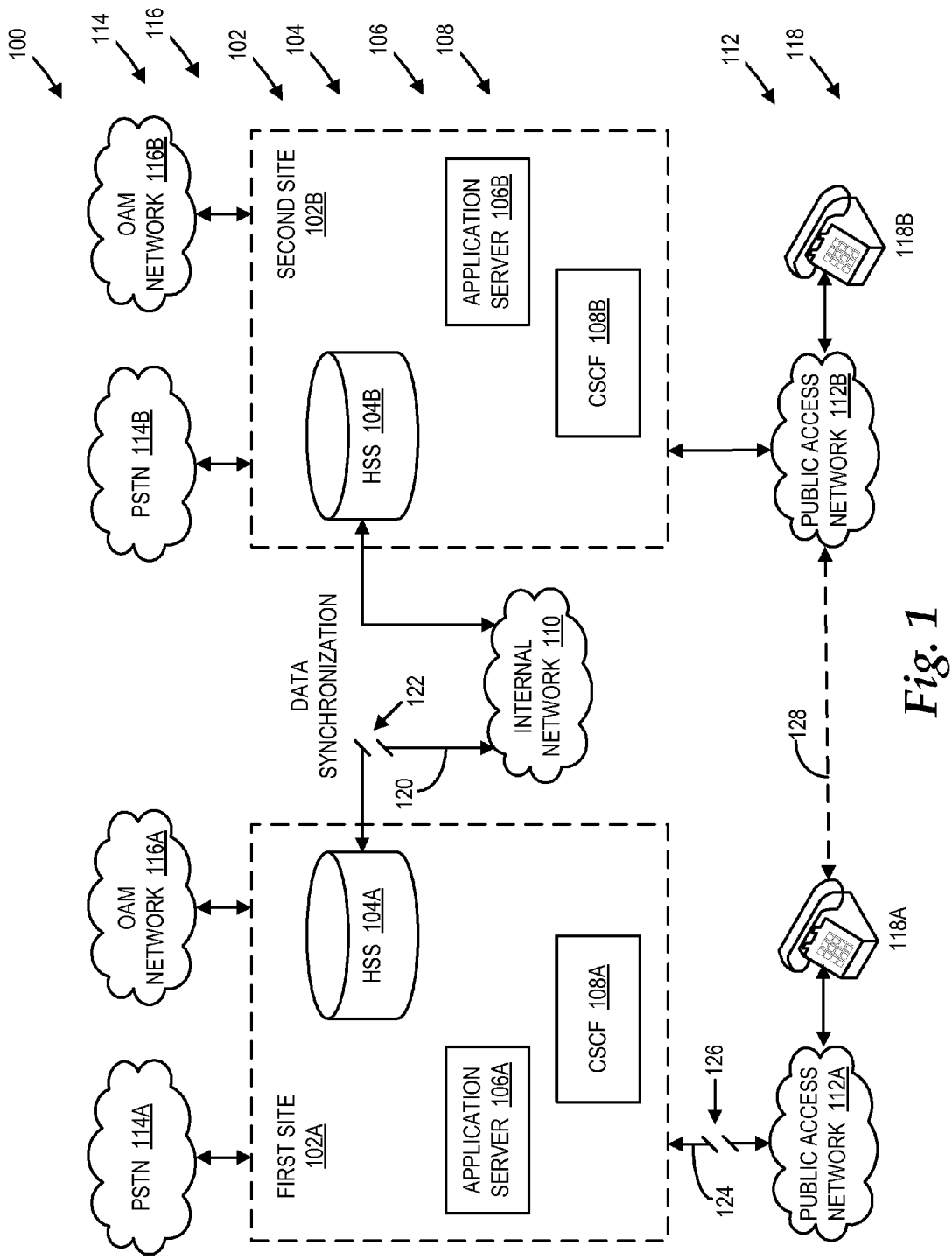
FIG. 1 is a network architecture diagram illustrating a data synchronization process in which data integrity between subscriber databases is compromised, in accordance with exemplary embodiments.

In the following detailed description, references are made to the accompanying drawings that form a part hereof, and which are shown by way of illustration, using specific embodiments or examples. Referring now to the drawings, in which like numerals represent like elements through the several figures, aspects of a computing system and methodology ensuring correct subscriber information at a subscriber database will be described. FIG. 1 shows an illustrative network architecture 100 of a geographical redundant deployment containing a first site 102A and a second site 102B (collectively referred to as sites 102). In one embodiment, the first site 102A is located at a different geographical location than the second site 102B. For example, the first site 102A and the second site 102B may be located at different states. Further, geographical redundancy between the first site 102A and second site 102B may ensure that the first site 102A and the second site 102B share different cables, network elements (e.g., a router), and other physical equipment that operate the network. Thus, a cut cable or a damaged router that causes a network problem at the first site 102A will not affect the second site 102B.

The first site 102A includes a home subscriber server ("HSS") 104A, an application server 106A, and a call session control function ("CSCF") 108A. The second site 102B includes a HSS 104B, an application server 106B, and a CSCF 108B. The HSS 104A and the HSS 104B may be collectively referred to as HSSs 104. The application servers 106A and 106B may be collectively referred to as application servers 106. The CSCFs 108A and 108B may be collectively referred to as CSCFs 108. It should be appreciated that only two sites 102 are shown for the sake of simplicity. However, any number of geographically redundant sites may be configured like the sites 102 and utilized in order to increase the likelihood of recovery from a catastrophic disaster at one or more sites.

The HSSs 104, the application servers 106, and the CSCFs 108 are part of the Internet Protocol ("IP") multimedia subsystem ("IMS") as defined by the 3rd Generation Partnership Project ("3GPP"). Generally, the HSSs 104 are databases that store subscriber information in a centralized manner. For example, the HSSs 104 may store location information (e.g., an IP address) associated with each subscriber. The HSSs 104 may also store the types of services that are associated with each subscriber. The application servers 106 provide the services that are specified by the HSSs 104. Examples of services include call waiting, caller identification ("ID"), call forwarding, three-way calling, and the like. The CSCFs 108 serve as an entry point for the signaling of incoming calls. The CSCFs 108 perform the necessary database queries to the HSSs 104 in order to route incoming calls to the proper destinations. The operations of the HSSs 104, the application servers 106, and the CSCFs 108 are well known to those skilled in the art and, as such, are not described in greater detail herein. Further, while only the HSSs 104, the application servers 106, and the CSCFs 108 are shown for the sake of simplicity, the sites 102 may include other functional entities, such as a media gateway control function ("MGCF"), as defined by the 3GPP for the IMS.

The network architecture 100 further includes multiple networks, such as an internal network 110, public access networks 112A and 112B (collectively referred to as public access networks 112), public switched telephone networks ("PSTNs") 114A and 114B (collectively referred to as PSTNs 114), and operations and management ("OAM") networks 116A and 116B (collectively referred to as OAM networks 116). The internal network 110 couples the first site 102A to the second site 102B and enables data synchronization between the first site 102A and the second site 102B. The public access network 112A couples the first site 102A with one or more user endpoints, such as a voice over IP ("VoIP") telephone 118A, an analog telephone adapter ("ATA") with an attached analog phone, a softphone computer application, a 3rd Generation ("3G") Internet Protocol Multimedia System ("IMS") capable handheld device, and the like. The public access network 112B couples the second site 102B with one or more user endpoints, such as a VoIP telephone 118B. The PSTNs 114A and 114B enable the first site 102A and the second site 102B, respectively, to initiate calls to and receive calls from public circuit-switched telephone networks. The OAM networks 116A and 116B provide OAM functionality, which may include tools to administer, monitor, and troubleshoot the first site 102A and the second site 102B, respectively.

In one exemplary embodiment, it is presumed that the ability for the first site 102A to access the internal network 110 and the public access network 112A is concurrent. Thus, if the first site 102A cannot access the public access network 112A, then the first site 102A also cannot access the internal network 110. Further, if the first site 102A can access the public access network 112A, then the first site 102A can access the internal network 110. Thus, in order to determine whether the first site 102A can access the internal network 110, a determination can be made whether the first site 102A can access the public access network 112A. However, the ability for the first site 102A to access the PSTNs 114 and the OAM networks 116 is independent of the internal network 110 and the public access network 112A. In other embodiments, no presumption is made that the ability for the first site 102A to access the internal network 110 and the public access network 112A is concurrent. As illustrated in FIG. 1, a connection 120 between the first site 102A and the internal network 110 is broken at 122. Further, a connection 124 between the first site 102A and the VoIP telephone 118A is also broken at 126. The connection 120 and the connection 124 may concurrently fail based on a shared network resource, such as a cut cable or a damaged router.

The connection 120 that is broken at 122 prevents data synchronization between the first site 102A and the second site 102B. As such, updates made to subscriber information stored in the HSS 104A cannot be synchronized with the subscriber information stored in the HSS 104B. Further, the connection 124 that is broken at 126 prevents the VoIP telephone 118A from accessing the first site 102A, and in particular, the CSCF 108A to initiate and receive calls. In order to maintain connectivity for initiating and receiving calls, the VoIP telephone 118A may register with the second site 102B as indicated by a connection 128 shown as a dotted line.

Upon registering with the second site 102B, the VoIP telephone 118A may initiate and receive calls through the second site 102B. As calls are made and received through the second site 102B, the HSS 104B may update its subscriber information. The HSS 104B may also update the time stamps associated with its subscriber information to indicate that the subscriber information has been updated.

Since the public access network 112A is not accessible, no incoming or outgoing calls can be made through the first site 102A. As such, few updates, if any, are typically made to the HSS 104A while the VoIP telephone 118A is registered with the second site 102B. However, there are some instances in which the subscriber information stored in the HSS 104A can still be updated. In particular, although the internal network 110 and the public access network 112A are down, the PSTN 114A is still operative. The PSTN 114A may not be aware that the VoIP telephone 118A has registered with the second site 102B. Thus, calls received from public circuit-switched telephone networks may still be routed through the first site 102A.

Upon receiving a call from the PSTN 114, the CSCF 108A will not be able to route the call to the VoIP telephone 118A. Instead, the CSCF 108A may forward the call to a voicemail service associated with the VoIP telephone 118A. In the alternative, the CSCF 108A may send an error message or busy signal across the PSTN 114 to the initiator of the call. Although the CSCF 108A cannot route the call to the VoIP telephone 118A, the HSS 104A may update the subscriber information and the time stamps associated with the VoIP telephone 118A. However, since the VoIP telephone 118A is not registered with the first site 102A, this updated subscriber information may incorrectly indicate that the CSCF 108A is still handling the VoIP telephone 118A with a newer timestamp on its subscriber records.

After the internal network 110 and the public access network 112A are restored, the data synchronization process between the HSSs 104 may be reinitiated. Although the HSS 104B is likely updated as calls are initiated and received through the second site 102B, in some instances as previously described, the HSS 104A may also be incorrectly updated due to the calls received through the PSTN 114A. If the time stamps for the incorrect subscriber data stored in the HSS 104A are newer than the time stamps for the correct subscriber data stored in the HSS 104B, the HSS 104B may be updated with the incorrect subscriber data from the HSS 104A. This can result in data corruption at the various sites, such as the sites 102A and 102B, in the telecommunications network, thereby leading to a disruption of service provided to customers.

Figure 2:
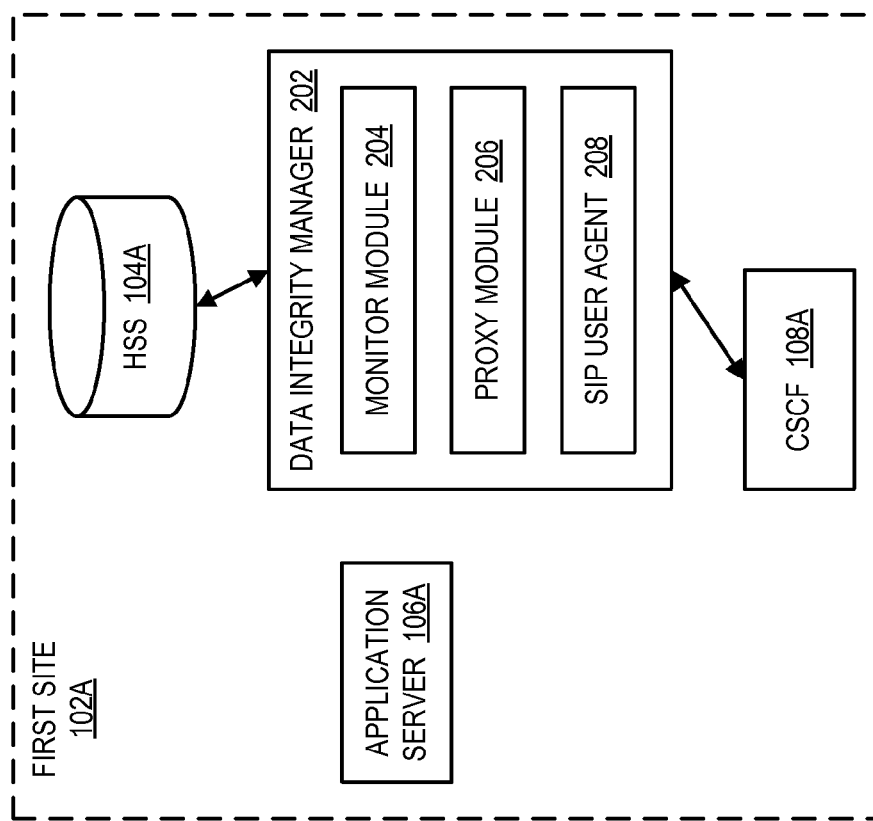
FIG. 2 is a diagram illustrating a data integrity manager operative to ensure data integrity during data synchronization between subscriber databases, in accordance with exemplary embodiments.

One way to prevent the HSS 104B from being overwritten with incorrect subscriber data from the HSS 104A is to block the update of time stamps in the HSS 104A. Referring now to FIG. 2, a data integrity manager 202 is illustrated in accordance with exemplary embodiments. The data integrity manager 202 is operative to block the update of time stamps in the HSS 104A and may be implemented as software, hardware, firmware, or combinations thereof. The data integrity manager 202 is coupled to the HSS 104A and the CSCF 108A. The data integrity manager 202 includes a monitor module 204, a proxy module 206, and a session initiation protocol ("SIP") user agent 208. The operations of the monitor module 204, the proxy module 206, and the SIP user agent 208 are described in greater detail below.

According to embodiments, the monitor module 204 is operative to monitor originating SIP requests from the CSCF 108A and to determine whether the public access network 112A is available. In one example, by determining whether the public access network 112A is available, a determination can also be made whether the internal network 110 is available. The SIP requests indicate the initiation of outgoing calls from user endpoints, such as the VoIP telephone 118A. For example, the VoIP telephone 118A may send a SIP INVITE message to another user endpoint, such as the VoIP telephone 118B, through the CSCF 108A. Since outgoing calls are initiated by SIP requests through the CSCF 108A, the monitor module 204 may determine whether the public access network 112A is available based on the number of SIP requests received at the CSCF 108A. In particular, the monitor module 204 may detect any dramatic reduction in the number of originating SIP requests over a given period of time.

In order to detect whether the CSCF 108A experiences a dramatic reduction in the number of originating SIP requests, the proxy module 206 is operative to count the number of SIP requests received at the CSCF 108A, according to embodiments. In particular, an initial filter criteria ("iFC") may be provisioned to each subscriber profile stored in the HSS 104A such that originating SIP requests from user endpoints, such as the VoIP telephone 118A, are forwarded to the proxy module 206 by the CSCF 108A. The proxy module 206 may increment a SIP request counter for each originating SIP request received. However, the proxy module 206 does not add itself to the SIP record-route header of the originating SIP request. The proxy module 206 then returns the originating SIP request back to the CSCF 108A and reports the value of the SIP request counter to the monitor module 204.

The monitor module 204 may compare the value of the SIP request counter with a SIP request threshold to determine whether the CSCF 108A has experienced a dramatic reduction in the number of originating SIP requests. Upon determining that the number of originating SIP requests has been dramatically reduced, the monitor module 204 may transmit a probe request to the SIP user agent 208. Upon receiving the probe request from the monitor module 204, the SIP user agent 208 may probe user endpoints, such as the VoIP telephone 118A, to verify that the public access network 112A is not operational, according to embodiments. In particular, the SIP user agent 208 may probe a given set of user endpoints at a diversified list of geographic locations. In one embodiment, the SIP user agent 208 may probe the user endpoints by sending SIP OPTIONS messages to the user endpoints and records the SIP responses from the user endpoints. The SIP user agent 208 may then report the result of the probe, and in particular, the number of responding user endpoints and the number non-responding user endpoints, to the monitor module 204.

The monitor module 204 may compare the number of responding user endpoints or the number of non-responding user endpoints to a SIP response threshold. For example, a number of responding user endpoints below the SIP response threshold may indicate that the public access network 112A is not available. In the alternative, a number of non-responding user endpoints above the SIP response threshold may indicate that the public access network 112A is not available. If the results of the probe indicate that the public access network 112A is not available, then the monitor module 204 may alter the logic of the HSS 104A in order to stop updating time stamps. By stopping the HSS 104A from updating time stamps, any incorrect data stored in the HSS 104A is not copied to the HSS 104B during data synchronization after the public access network 112A and the internal network 110 are restored.

The monitor module 204 may continue to monitor the condition of the public access network 112A by monitoring the number of SIP requests received at the CSCF 108A and/or probing the user endpoints. Upon detecting that the public access network 112A has been recovered, the monitor module 204 may alter the logic of the HSS 104A in order to restart updating time stamps. As previously discussed, by determining that the public access network 112A has been recovered, a determination is also made that the internal network 110 has also been recovered.

Figure 3:
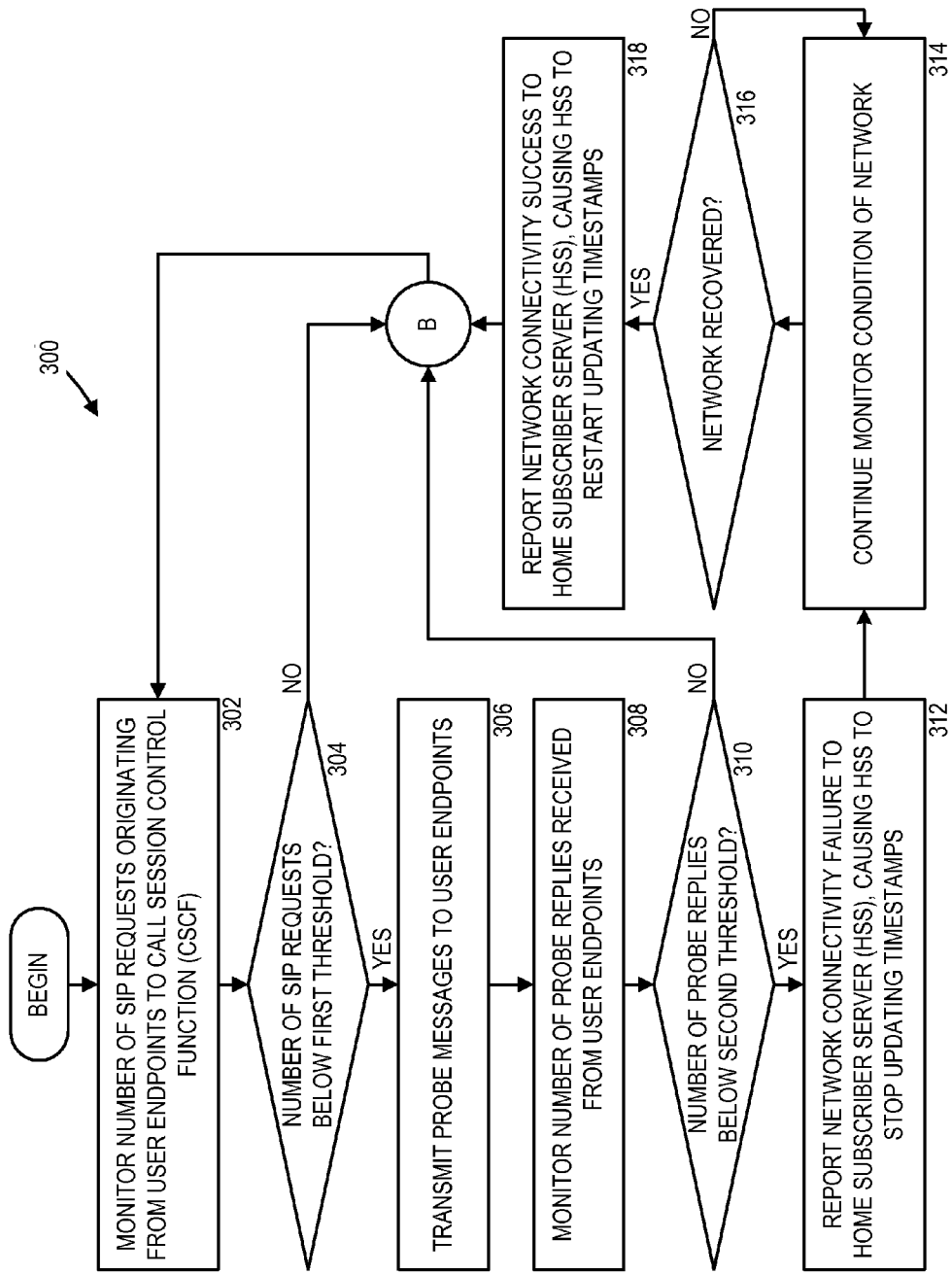
FIG. 3 is a flow diagram illustrating a method for ensuring data integrity during data synchronization, in accordance with exemplary embodiments.

FIG. 3 is a flow diagram illustrating a method 300 for ensuring that correct subscriber information is provided during data synchronization between the HSS 104A and the HSS 104B, in accordance with exemplary embodiments. According to the method 300, the proxy module 206 monitors (at 302) a number of SIP requests originating from user endpoints, such as the VoIP telephone 118A, to the CSCF 108A. In particular, an iFC may be provisioned to subscriber profiles stored in the HSS 104A such that each originating SIP request is forwarded to the proxy module 206. An exemplary SIP request may indicate that the VoIP telephone 118A is attempting to initiate a call to another user endpoint, such as the VoIP telephone 118B. In order for the SIP request originating from the VoIP telephone 118A to reach the CSCF 108A, the public access network 112A must be available. As such, monitoring the number of SIP requests originating from user endpoints may indicate whether the public access network 112A is available.

After monitoring the number of SIP requests for a given period of time, the proxy module 206 may return the number of originating SIP requests to the monitor module 204. The monitor module 204 then determines (at 304) whether the number of SIP requests originating from user endpoints is below a SIP request threshold. In one embodiment, the SIP request threshold represents a minimum number of SIP requests that indicates that the public access network 112 is available. Thus, if the number of SIP requests originating from user endpoints is greater than the SIP request threshold, then the public access network 112 is considered available. If the number of SIP requests originating from user endpoints is less than the SIP request threshold, then the public access network 112 is considered unavailable. The SIP request threshold may be adjusted depending on the particular implementation. Further, the SIP request threshold may be configured in terms of the minimum number of SIP requests that indicates that the public access network 112 is unavailable, according to further embodiments.

If the monitor module 204 determines that the number of SIP requests originating from user endpoints is above the SIP request threshold, then the method 300 loops back, and the proxy module 206 continues to monitor (at 302) a number of SIP requests originating from user endpoints. If the monitor module 204 determines that the number of SIP requests originating from user endpoints is below the SIP request threshold, then the monitor module 204 may transmit a probe request to the SIP user agent 208, which is configured to probe user endpoints, such as the VoIP telephone 118A, to verify whether the public access network 112A is unavailable. In particular, the SIP user agent 208 transmits (at 306) probe messages, such as SIP OPTIONS messages, to one or more of the user endpoints across the public access network 112A. As used herein, a probe message refers to any suitable message in which the recipient generates an "echo" or other reply in response to receiving the probe message. As such, the probe message can be utilized to indicate the availability of the public access network 112A depending on whether the "echo" or "ping" is received. It should be appreciated that if an "echo" or "ping" is used in place of the SIP OPTIONS messages, then the SIP user agent 208 may be replaced with other suitable processes operative to cause the recipient to generate "echo" or "ping" responses.

Upon sending the probe messages to the user endpoints, the SIP user agent 208 monitors (at 308) the number of probe replies received from the user endpoints in response to the probe messages. The number of probe replies may be monitored relative to the number of probe messages sent to the user endpoints. In this way, the number of replies received from the user endpoints can indicate whether the public access network 112A is available.

After monitoring the number of probe replies from the user endpoints for a given period of time, the SIP user agent 208 may return the number of probe replies to the monitor module 204. The monitor module 204 then determines (at 310) whether the number of probe replies received from the user endpoints is below a probe reply threshold. In one embodiment, the probe reply threshold represents a minimum number of probe replies that indicates that the public access network 112 is available. Thus, if the number of probe replies received from the user endpoints is greater than the probe reply threshold, then the public access network 112 is considered available. If the number of probe replies received from the user endpoints is less than the probe reply threshold, then the public access network 112 is considered unavailable. The probe reply threshold may be adjusted depending on the particular implementation. Further, the probe reply threshold may be configured in terms of the minimum number of probe replies that indicates that the public access network 112 is unavailable, according to further embodiments.

In one embodiment, an assumption is made that if the public access network 112A associated with the first site 102A becomes unavailable, then the corresponding internal network 110 also becomes unavailable. In this embodiment, if the public access network 112A associated with the first site 102A becomes available, then the corresponding internal network 110 also becomes available. In other embodiments, no such assumption is made, and other factors may be utilized in order to determine any correspondence between the operation of the public access network 112A and the internal network 110.

If the monitor module 204 determines that the number of probe replies received from the user endpoints is above the probe reply threshold, then the method 300 terminates. If the monitor module 204 determines that the number of probe replies received from the user endpoints is below the probe reply threshold, then the monitor module 204 reports (at 312) the network connectivity failure of the public access network 112A (and correspondingly the internal network 110) to the HSS 104A. Upon receiving the report that the public access network 112A is unavailable, the HSS 104A alters its logic to stop updating data time stamps. As such, while the public access network 112A and the internal network 110 are unavailable, the data time stamps are not updated at the HSS 104A. When the data synchronization process occurs at a later time, for example when the public access network 112A and the internal network 110 are restored, the HSS 104B will not be overwritten with incorrect subscriber information from the HSS 104A.

The monitor module 204 continues to monitor (at 314) the condition of the public access network 112A through the SIP requests and/or the probe messages as previously described. The monitor module 204 then determines (at 316) whether the public access network 112A has recovered from being unavailable. Upon determining that the public access network 112A has become available, the monitor module 204 reports (at 318) the network connectivity success of the public access network 112A (and correspondingly the internal network 110) to the HSS 104A. Upon receiving the report that the public access network 112A is available, the HSS 104A alters its logic to restart updating data time stamps. As such, the user endpoints, such as the VoIP telephone 118A, may return to the public access network 112A, and the HSS 104A may be updated under normal operation. Upon determining that the public access network 112 has not become available, the method 300 loop back, and the monitor module 204 continues to monitor (at 314) the condition of the public access network 112A.

Figure 4:
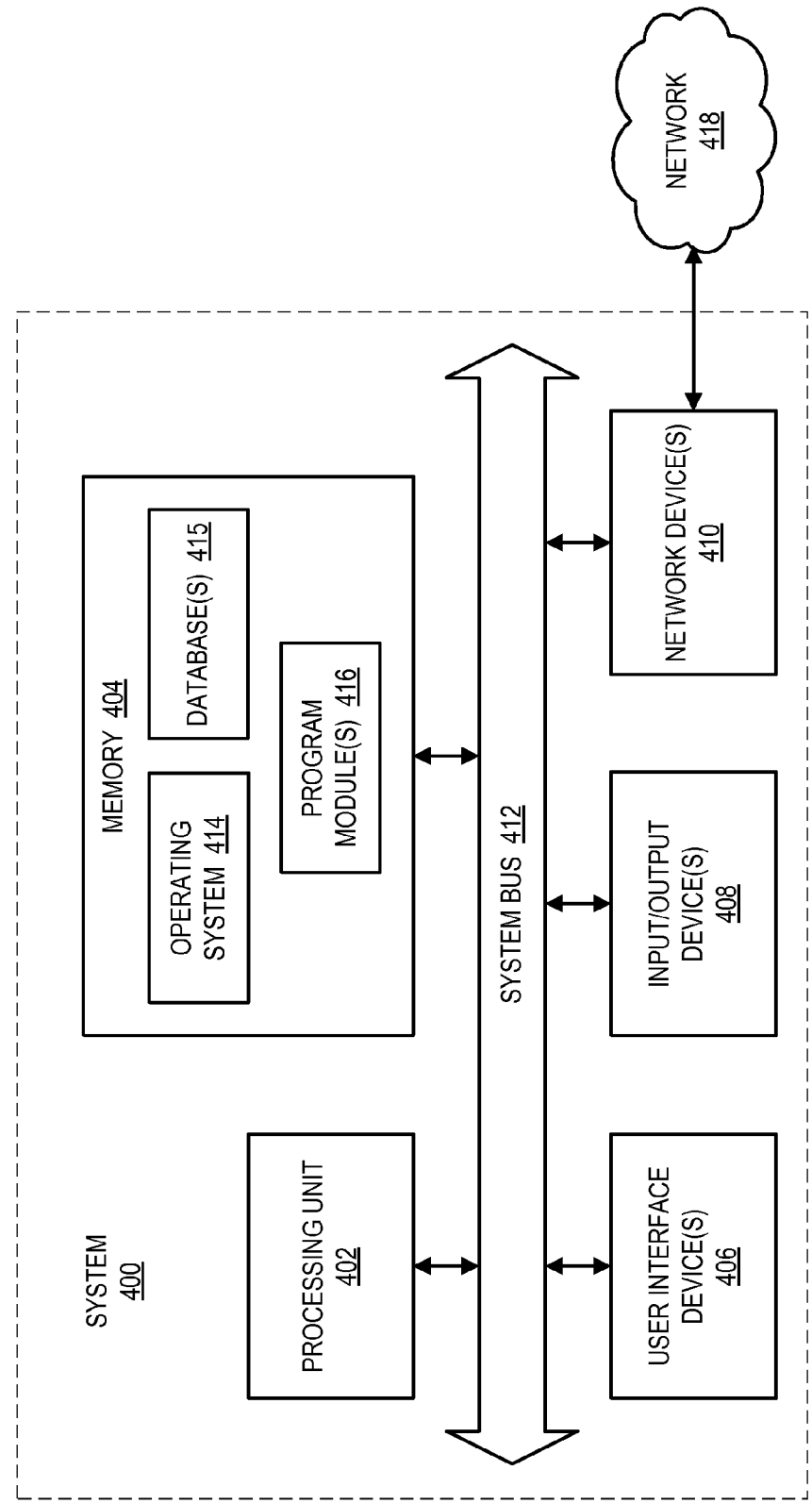
FIG. 4 is a computer architecture diagram showing aspects of an illustrative computer hardware architecture for a computing system capable of implementing aspects of the embodiments presented herein.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a system 400 operative to ensure correct subscriber information at a subscriber database, in accordance with exemplary embodiments. The system 400 includes a processing unit 402, a memory 404, one or more user interface devices 406, one or more input/output ("I/O") devices 408, and one or more network devices 410, each of which is operatively connected to a system bus 412. The bus 412 enables bidirectional communication between the processing unit 402, the memory 404, the user interface devices 406, the I/O devices 408, and the network devices 410. Examples of the system 400 include, but are not limited to, computers, servers, personal digital assistants, cellular phones, or any suitable computing devices. Examples of computing devices may include the application servers 106, the CSCFs 108, VoIP telephones 118A and 118B, and the data integrity manager 202.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 414, one or more databases 415, and one or more program modules 416, according to exemplary embodiments. Examples of the database 415 may include the HSS 104A and the HSS 104B. Examples of the program modules 416 may include the data integrity manager 202, the monitor module 204, the proxy module 206, and the SIP user agent 208. In one embodiment, the method 300 for ensuring that correct subscriber information is provided during data synchronization between the HSS 104A and the HSS 104B as described above with respect to FIG. 3 may be embodied as one of the program modules 416. Examples of operating systems, such as the operating system 414, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 400.

The user interface devices 406 may include one or more devices with which a user accesses the system 400. The user interface devices 406 may include, but are not limited to, computers, servers, personal digital assistants, cellular phones, or any suitable computing devices. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the system 400 to communicate with other networks or remote systems via a network 418, such as the public access networks 112, the internal network 110, the PSTNs 114, and the OAM networks 116. Examples of the network devices 410 may include, but are not limited to, a modem, a radio frequency ("RF") or infrared ("IR") transceiver, a telephonic interface, a bridge, a router, or a network card. The network 418 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 418 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for ensuring data integrity during data synchronization, comprising:
    monitoring a number of originating call requests from a plurality of user endpoints received across a public access network at a Call Session Control Function;
    determining whether the number of originating call requests is below a first threshold, the first threshold comprising a minimum number of original requests received at the call session control function indicating that the public access network is available;
    responsive to determining that the number of originating call requests is below the first threshold, transmitting probe messages to at least a portion of the plurality of user endpoints across the public access network;
    monitoring a number of the user endpoints that return probe replies in response to the probe messages;
    determining whether the number of the user endpoints is below a second threshold, the second threshold comprising a minimum number of return probe replies indicating that the public access network is available; and
    responsive to determining that the number of the user endpoints is below the second threshold, reporting to a Home Subscriber Server that the public access network is unavailable, thereby causing the Home Subscriber Server to stop updating time stamps, wherein if the public access network is unavailable then an internal network is also unavailable the internal network enabling data synchronization between the Home Subscriber Server and another Home Subscriber Server at a different physical location.

2. The method of claim 1, further comprising:
    responsive to reporting to the Home Subscriber Server that the public access network is unavailable, monitoring the public access network to determine whether the public access network has recovered from being unavailable; and
    responsive to determining that that the public access network has recovered from being unavailable, reporting to the Home Subscriber Server that the public access network is available, thereby causing the Home Subscriber Server to restart updating time stamps.

3. The method of claim 1, wherein the originating call requests comprise session initiation protocol INVITE messages, and wherein the probe messages comprise session initiation protocol OPTIONS messages.

4. The method of claim 1, wherein the user endpoints comprise a voice over Internet Protocol telephone.

5. A system for ensuring data integrity during data synchronization, comprising:
    a memory for storing a program containing code for ensuring data integrity during data synchronization; and
    a processor functionally coupled to the memory, the processor being responsive to computer-executable instructions contained in the program and operative to at least:
        monitor a number of originating call requests from a plurality of user endpoints received across a public access network at a Call Session Control Function,
        determine whether the number of originating call requests is below a first threshold, the first threshold comprising a minimum number of original requests received at the call session control function indicating that the public access network is available,
        responsive to determining that the number of originating call requests is below the first threshold, transmit probe messages to at least a portion of the plurality of user endpoints across the public access network,
        monitor a number of the user endpoints that return probe replies in response to the probe messages,
        determine whether the number of the user endpoints is below a second threshold, the second threshold comprising a minimum number of return probe replies indicating that the public access network is available, and
        responsive to determining that the number of the user endpoints is below the second threshold, report to a Home Subscriber Server that the public access network is unavailable, thereby causing the Home Subscriber Server to stop updating time stamps, wherein if the public access network is unavailable then an internal network is also unavailable, the internal network enabling data synchronization between the Home Subscriber Server and another Home Subscriber Server at a different physical location.

6. The system of claim 5, the processor being responsive to further computer-executable instructions contained in the program and operative to at least:
    responsive to reporting to the Home Subscriber Server that the public access network is unavailable, monitor the public access network to determine whether the public access network has recovered from being unavailable, and
    responsive to determining that that the public access network has recovered from being unavailable, report to the Home Subscriber Server that the public access network is available, thereby causing the Home Subscriber Server to restart updating time stamps.

7. The system of claim 5, wherein the originating call requests comprise session initiation protocol INVITE messages, and wherein the probe messages comprise session initiation protocol OPTIONS messages.

8. The system of claim 5, wherein the user endpoints comprise a voice over Internet Protocol telephone.

9. A non-transitory computer-readable medium having instructions stored thereon for execution by a processor to provide a method for ensuring data integrity during data synchronization, the method comprising:
    monitoring a number of originating call requests from a plurality of user endpoints received across a public access network at a Call Session Control Function;

determining whether the number of originating call requests is below a first threshold, the first threshold comprising a minimum number of original requests received at the call session control function indicating that the public access network is available;

responsive to determining that the number of originating call requests is below the first threshold, transmitting probe messages to at least a portion of the plurality of user endpoints across the public access network;

monitoring a number of the user endpoints that return probe replies in response to the probe messages;

determining whether the number of the user endpoints is below a second threshold, the second threshold comprising a minimum number of return probe replies indicating that the public access network is available; and responsive to determining that the number of the user endpoints is below the second threshold, reporting to a Home Subscriber Server that the public access network is unavailable, thereby causing the Home Subscriber to stop updating time stamps, wherein if the public access network is unavailable, then an internal network is also unavailable, the internal network enabling data synchronization between the Home Subscriber Server and another Home Subscriber Server at a different physical location.

10. The non-transitory computer-readable medium of claim 9, the method further comprising:

responsive to reporting to the Home Subscriber Server that the public access network is unavailable, monitoring the public access network to determine whether the public access network has recovered from being unavailable; and responsive to determining that that the public access network has recovered from being unavailable, reporting to the Home Subscriber Server that the public access network is available, thereby causing the Home Subscriber Server to restart updating time stamps.

11. The non-transitory computer-readable medium of claim 9, wherein the originating call requests comprise session initiation protocol INVITE messages, and wherein the probe messages comprise session initiation protocol OPTIONS messages.

12. The non-transitory computer-readable medium of claim 9, wherein the user endpoints comprise a voice over Internet Protocol telephone.

* * * * *